July 1, 1969 F. E. POST 3,453,534
TIME SYNCHRONIZING A TRANSFER FUNCTION ANALYZER WITH RECORDED
TESTING POINT SIGNALS
Filed Sept. 22, 1966 Sheet 1 of 3

INVENTOR
FRANK E. POST
BY Maleson & Ratner
ATTORNEYS.

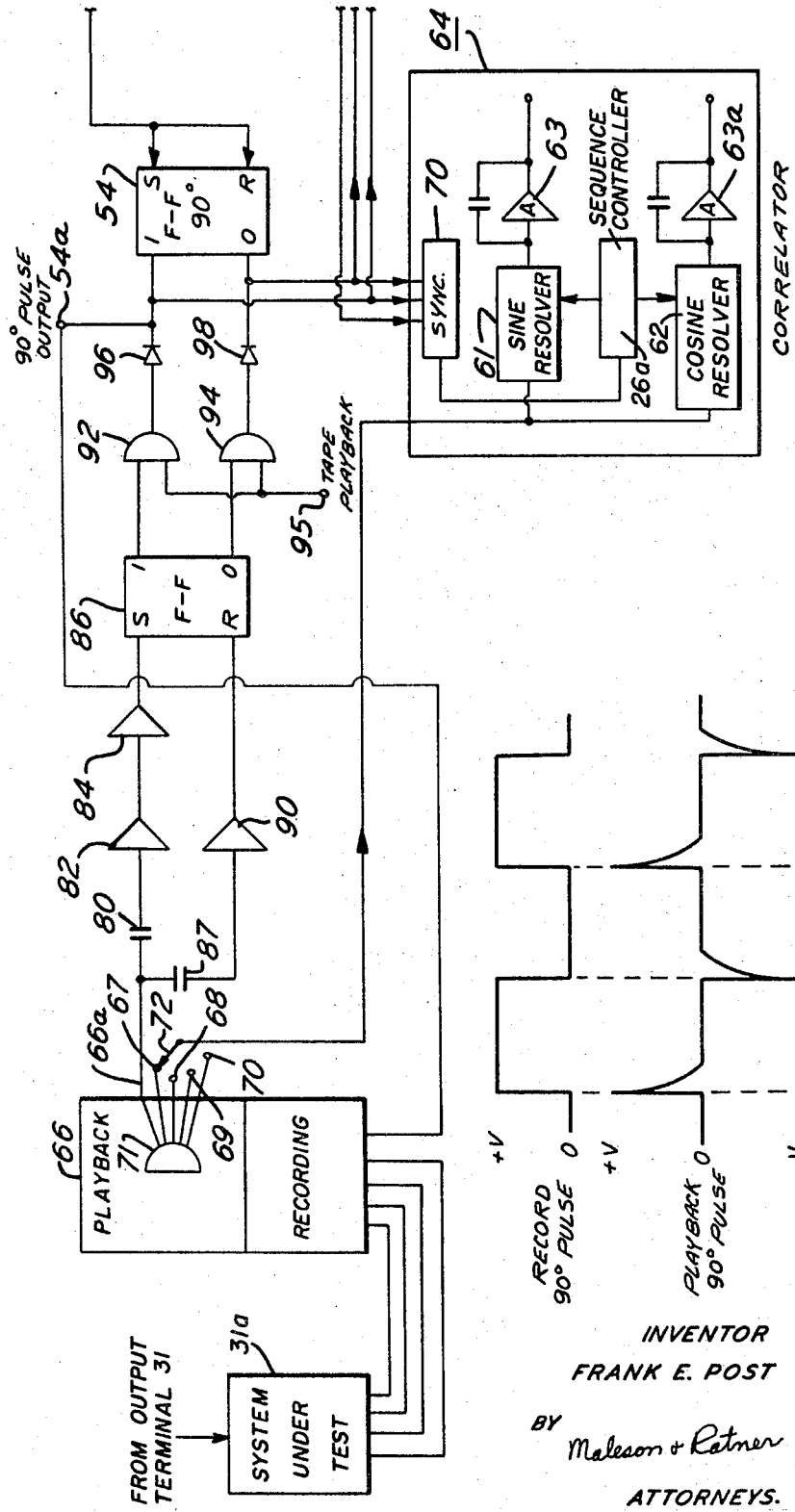

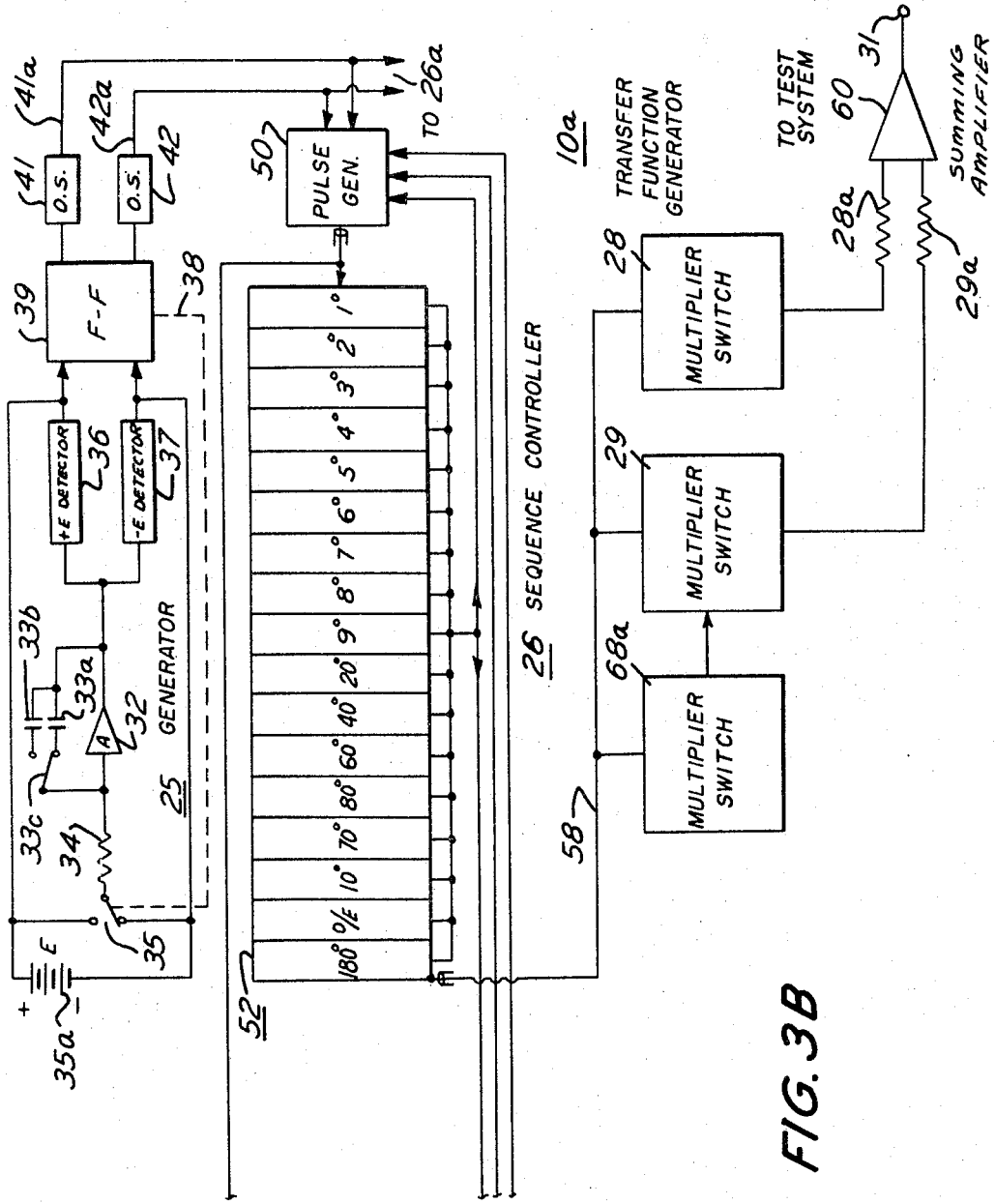

United States Patent Office 3,453,534
Patented July 1, 1969

3,453,534
TIME SYNCHRONIZING A TRANSFER FUNCTION ANALYZER WITH RECORDED TESTING POINT SIGNALS
Frank E. Post, Warminster, Pa., assignor to Weston Instruments, Inc., Newark, N.J., a corporation of Delaware
Filed Sept. 22, 1966, Ser. No. 581,275
Int. Cl. G01r 27/00, 27/02, 23/16
U.S. Cl. 324—57                8 Claims

ABSTRACT OF THE DISCLOSURE

A system for time synchronizing a transfer function analyzer having a function generator which produces a substantially sinusoidal output waveform. A first bistable circuit is effective to superimpose alternately (1) only upwardly sloping signals on rectangular signals during one 90° segment of the output waveform and (2) only downwardly sloping signals on rectangular signals during the next 90° segment. A recording is made simultaneously with time of signals at test points of a system under test and control signals from the first bistable circuit. The recording is played back and one of the test point signals is applied to a correlator which measures the transfer function in time synchronism with the function generator. The recorded control signals are applied to a second bistable circuit and a gating circuit prevents the switching of the first bistable circuit when the switching signals tend to first switch the first bistable circuit until the recorded signals switch the second bistable circuit.

---

This invention relates to transfer function analysis and more particularly to locking the frequency of a function generator in a transfer function analyzer. Transfer function analysis tests have been performed by generating a signal to stimulate a system under test. The system under test responds to the stimulus over a range of frequencies and this response is then measured. In such tests the stimulating signal is used as a reference with its amplitude being kept constant while its frequency may be varied. For example, it may be required to generate a stimulating signal of substantially sinusoidal waveform whose frequency and amplitude are accurately known and whose frequency may be varied over a wide range.

A function generator capable of meeting the foregoing requirements is described in patent application Ser. No. 298,988, filed July 31, 1963 for Transfer Function Generator by R. Catherall et al. (now abandoned), and a continuation of application Serial Number 298,988 issued as Patent No. 3,340,469. In this function generator a sinusoidal waveform is produced by generating a plurality of separate signals of rectangular waveform, a plurality of separate signals of triangular waveform and summing the signals of rectangular and triangular waveform to provide an oscillatory signal of composite waveform. The relationship of the currents of rectangular and triangular waveform are predetermined so that the oscillatory current of composite waveform has a given waveform, frequency and amplitude. In this manner, the amplitude of the stimulating signal applied to the system under test remains constant throughout the test without further adjustment.

In a testing operation, the output of the system under test is measured by means of a correlator in which the system output is resolved into signal components in phase and in quadrature with the system output. The function generator controls the correlator which includes a separate analog integrator for each of the components. Each integrator integrates its respective input and stores the output as a DC voltage. The stored DC voltages are proportional to the cartesian coordinates of the vector which represents the fundamental frequency component of the output signal from the system under test. The coordinates which are stored as DC voltages may be resolved to provide a vector length or amplitude R and a phase angle θ.

A system under test may have a plurality of points within the system which should be measured simultaneously. It will be understood that on-line measurement of a plurality of test points would require an equal number of correlators. In view of the resultant large hardware requirement on-line measurement is not usually feasible and off-line measurement has been provided by applying each of the test points to a different input of a multichannel tape recorder. After recording on-line on a multichannel tape, analysis may be performed off-line by a single correlator which measures in turn the data on each of the tape channels. However, inaccuracies have occurred because of changes in calibration at the time of measurement due to variation in tape speed during recording or playback. Thus the input signal to the correlator is no longer controlled in time sequence by the function generator and as a result, the output information is inaccurate.

Accordingly an object of the invention is a transfer function analyzer in which data recorded off-line is accurately analyzed.

Another object of the invention is synchronizing the correlator so that it operates in time synchronism with each one of the recorded data channels.

In accordance with one embodiment of the present invention, the function generator includes a sequence controller for timing the oscillatory signal of composite waveform (stimulating signal). The sequence controller includes a 90° flip-flop for producing control signals to reverse the slope of one of the triangular sides of the triangular waveforms at each 90° of the stimulating signal. When the signals at a plurality of test points are recorded on a multichannel tape recorder, a separate tape channel is used to record the control signal output of the 90° flip-flop with all of the recordings being made simultaneously. The tape is played back and the correlator measures the data on a selected one of the tape channels. In addition, the recorded 90° control signals are applied to a control flip-flop which changes state in accordance with those signals. Gating means are connected to the outputs of the 90° flip-flop and the control flip-flop to switch the 90° flip-flop when the control flip-flop is first switched by the recorded control signals. On the other hand, if the input signals to the 90° flip-flop would tend to first switch it before the control flip-flop is switched, then the control flip-flop is effective to prevent the switching of the 90° flip-flop until the recorded signals switch the control flip-flop.

In this manner, the 90° flip-flop of the function generator is in exact time sequence with the control signals on the tape and with each channel of test point data on the tape. Thus, the correlator operates in synchronism with each selected recorded test point signal. Accordingly, any variation in tape speed during recording or playback will have no effect upon accuracy of measurement.

Other objects and advantages of the invention will become apparent from the following description taken in conjunction with the accompanying drawings in which.

FIGS. 3A and 3B when taken together, schematically illustrate in part block diagram form a transfer function analyzer including a frequency locking system embodying the invention;

FIG. 4 are waveforms explanatory of FIG. 3A.

Figure 1:
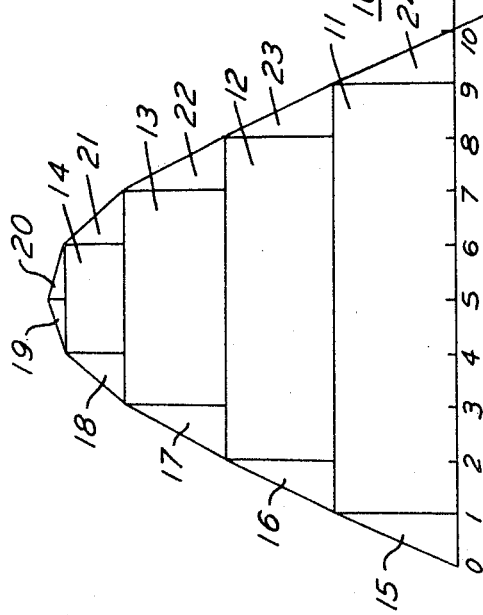
FIG. 1 is an explanatory diagram showing the synthesis of a sine wave from separate currents of rectangular and triangular form.

Referring now to FIG. 1 there is shown one complete cycle of a waveform 10 approximating a sine wave and which may be synthesized by a transfer function generator. It will be seen that the first half cycle of wave 10 may comprise four parts 11–14 of rectangular waveform. The rectangular waveforms 11–14 are of progressively shorter duration and of progressively smaller amplitudes with the four parts being symmetrical and added one on the other in the illustrated order. Further, the first quarter cycle has added thereto five parts 15–19 of right-angled triangular waveform of equal durations but progressively smaller amplitudes. The second quarter cycle also has five parts 20–25 identical in amplitude with parts 19–15 respectively but with the slopes of the hypotenuses reversed at 90° in sine wave 10.

Figure 2:
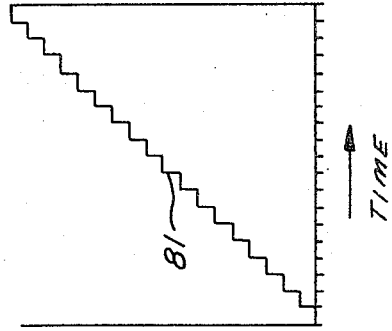
FIG. 2 is an explanatory waveform showing a stepped triangular current.

It will be understood that the five parts 15–19 of triangular waveform are each representative of 18° steps. In order to provide a smoother sinusoidal waveform, the hypotenuse of each of the triangular waveforms 15–19 may be divided into one degree steps as shown in FIG. 2. In FIG. 2 the stepped line or hypotenuse has been formed into 18 steps in the interval 0–1 which corresponds to the interval 0–1 in FIG. 1. The second quarter cycle parts 20–24 may also have their hypotenuses stepped in similar manner.

It will be understood that waveform 10 may be divided into more parts such as eight parts of rectangular waveform and a corresponding number of nine parts of triangular waveform. The second half cycle of wave 10 is identical with the first half cycle except of course that it is negative going instead of positive going.

The structure and operation of a transfer function generator for synthesizing the above described waveform is shown and described in detail in the above cited patent and in Instruction Manual-Transfer Function Analyzer Model Series DA400 by Weston-Boonshaft & Fuchs, Weston Instruments, Inc., Hatboro Industrial Park, Hatboro, Pa. Various elements of the above cited application are identical with the function generator 10a and correlator 64 shown in FIGS. 3A and 3B herein and therefor have been identified by corresponding reference characters.

More specifically a transfer function generator 10a includes a master oscillator or clock pulse generator 25. Generator 25 comprises an integrator having an amplifier 32 and parallel connected feedback capacitors 33a and 33b. A selector switch 33c is connected to the input of amplifier 32 and is used to select one of the feedback capacitors thereby to vary the rate of integration as a function of the capacitive value of the selected capacitor 33a, 33b.

A selector switch 35 selects a voltage of +E volts or —E volts from a battery 35a for application through an input resistor 34 to the input of amplifier 32. In this manner the integrator may generate a linear voltage ramp of positive or negative slope in accordance with the setting of switch 35.

Two voltage detectors 36 and 37 have their respective inputs connected to the output of amplifier 32. The outputs of detectors 36 and 37 are connected to battery 35a with the output of detector 36 being connected to +E volts and the output of detector 37 being connected to —E volts. In this manner detectors 36 and 37 determine when +E volts and —E volts respectively have been reached in the positive and negative voltage ramps. The outputs of detectors 36 and 37 are applied to control the state of a bistable circuit or flip-flop 39.

Flip-flop 39 is connected to switch 35 as indicated by a broken line 38 and is arranged so that when a ramp of positive slope is being generated and reaches a value +E volts, switch 35 is actuated by detector 36 from its illustrated position to its other position and the integrator begins to generate a ramp of a negative slope. The negative slope ramp continues until it reaches a value of —E volts and switch 35 is restored by flip-flop 39 to its illustrated position and the integrator begins to generate a ramp of positive slope and so on.

The two outputs of flip-flop 39 are connected to pulse shapers or one-shot circuits 41 and 42 respectively to provide sharp pulses at output conductors 41a and 42a respectively. These pulses are referred respectively as shift-odd and shift-even pulses and it will be understood that the shift-even pulses are interlaced with the shift-odd pulses. The recurrence period of the pulses on each of these trains may be equal to a time interval of 2° in a sinusoidal oscillation.

The shift-odd and shift-even pulses are applied by way of conductors 41a and 42a respectively to a sequence controller 26 which comprises a pulse generator 50, counter 52 and a 90° bistable circuit 54. The sequence controller applies control signals to multiplier switch circuits 28, 29 and 68a. The multiplier switch circuits are controlled so that successive excursions of triangular waveform begin at a succession of regularly recurring instances 0, 1, 2 . . . 10 as shown for example in FIG. 1 in the first half cycle. In addition, each excursion of the rectangular waveform has its leading and trailing edges coincident with the beginning of the excursions of the triangular waveform. The 1° steps of each of the triangular wave shapes are provided by multiplier switch circuit 68a. It will be understood that function generator 10a provides a waveform having eight rectangular parts and nine triangular parts in each quarter cycle.

More particularly, the interlaced odd and even shift pulses are applied to a pulse generator 50 which includes a plurality of gates which provide logic for counter 52 comprising a plurality of bistable circuits. The pulse generator 50 includes AND gates which route clock pulses into particular inputs of bistable circuits of counter 52 and bistable circuit 54 which causes a decimal count from 1° to 9°. At the count of 9°, a peak of a triangle has been reached and it is time for a next rectangle to be introduced by setting bistable circuit 10°. The foregoing is repeated with the count from 1° to 9° and then bistable circuit 20° is set and bistable circuit 10° reset and so on until 90° is reached. At that time 90° bistable circuit 54 is set which is effective to provide a control signal to cause counter 52 to count down from 89° back to 0°, thereby to reverse the slope of the hypotenuse of the right-angle triangular waveforms. At 0°, the 90° bistable circuit 54 is again reset and counter 52 counts up from 0° to 90° to again reverse the slope of the hypotenuse. In addition, the 180° bistable circuit is set to provide for a polarity reversal in the manner shown in FIG. 1. The counter 52 then counts to 90° on the negative portion of the sine wave and when 90° is reached, the 90° flip-flop is set to provide for the down count to 0°. In this manner there is provided both the first and second half cycle of a sinusoidal waveform.

The output signals from counter 52 are applied by way of a cable 58 to multiplier switches 28, 29 and 68a. Multiplier switch 28 may comprise four transistor switches which are connected so that upon application of the signals from counter 52, a plurality of rectangles of decreasing size are produced and these rectangles are added to provide the major steps of each half cycle. Similarly, multiplier switches 29 have applied thereto signals from counter 52 and comprise a plurality of transistor switches which generate the right-angled triangular pulses as previously described. In order to produce the 1° steps of each of the triangular pulses, there is provided multiplier 68a. It will be understood that multiplier 29 provides the weight of the slope of each of the hypotenuses of the triangular waves while the multiplier 68a provides the 1° incremental steps of the hypotenuse. The outputs of switches 28 and 29 are applied to a summing amplifier 60 having an output terminal 31, by way of resistors 28a and 29a respectively. In this manner there is produced a substantially sine wave of both positive and negative half cycles having its timing accurately controlled by sequence controller 26. Specifically, the timing of each of the 90° segments of the sine wave viz. 90°, 80°, 270°, 360°, etc., is accurately controlled by the 90° flip-flop 54.

The sine wave output is applied by way of output terminal 31 and may be applied as a stimulating signal to a system under test 31a. In a testing procedure an output of the system under test may be applied as an input signal to a correlator 64. The input signal to correlator 64 is simultaneously applied to a sine resolver 61 and a cosine resolver 62. The sine and cosine resolvers are each digitally synchronized with the sequence controller 26. Specifically, the 1-side and 0-side output terminals of the 90° flip-flop 54 are applied to a sync circuit of correlator 64. In addition, the outputs of counters 52 are also applied to sync circuit 70. The sync circuit is effective to apply an output signal to a correlator sequence controller 26a at a predetermined startpoint of the correlation. For example, the beginning point may be 0°, at which time a start signal is applied by sync circuit 70 to begin the counting by sequence controller 26a.

It will be understood that sequence controller 26a is similar in construction to that of controller 26 and counts in accordance with odd-even shift pulses applied by way of conductors 41a and 42a. Accordingly, controller 26a applies control signals to resolvers 61 and 62 so that these resolvers operate in synchronism with function generator 10a. Thus, in time sequence, resolvers 61 and 62 provide outputs representative of x sinwt and x coswt respectively. The outputs of resolvers 61 and 62 are applied to integrators 63 and 63a respectively which produce integration over N complete cycles to provide outputs representative of $$\int_0^{2\pi N} x \text{ sinwt and } \int_0^{2\pi N} x \text{ coswt}$$

respectively. The foregoing cartesian coordinates may be converted to polar coordinates to provide a vector length R and a phase angle θ. The structure and operation of correlator 64 together with generator 10a are described and shown in detail in the above cited patent and instruction manual.

As previously described, the system under test 31a may have a plurality of test points which are required to be measured simultaneously. If on-line measurement were to take place, then an equal number of correlators 64 would be needed which results in a very large hardware requirement. Accordingly, instead of providing a plurality of correlators, the test points are applied to differing input recording channels of a multichannel tape recorder 66, thereby to record the test point data on corresponding tape channels. As a control, a separate one of the recording channels is connected to terminal 54a to record the square wave output of the 90° flip-flop 54. In this manner, all of the tape channels are in synchronism one with the other and with the 90° signals.

On playback, the playback head 71 of tape recorder 66 includes five output channels with the upper channel 66a receiving the square wave signals of the tape channel having recorded the 90° signal. The remaining channels 67–70 of the playback each receive signals of associated tape channels each corresponding to a different test point. A selector device such as switch 72 may be utilized to select a desired one of the channels 67–70 and to apply that signal as the input to correlator 64.

As previously described, correlator 64 is controlled in accordance with the timing of generator 10a. However, if the 90° signals provided on control channel 66a are not in synchronism with flip-flop 54, then the test point signals recorded on the output channels 67–70 will also not be in synchronism with function generator 10a. For example, if the tape speed changes during either record or playback, then it is not possible accurately to correlate the data. Thus, in accordance with the invention, the timing of sequence controller 26 is controlled by the 90° pulses on channel 66a so that the data on test point channels 67–70 will be exactly in time sequence with controller 26 and accurate correlation of each of the test point channels may be provided.

More particularly, as previously described, 90° flip-flop 54 is effective to apply control signals by way of its 0 and 1-side output terminals to the input of pulse generator 50. In this manner, up-down counting of the counter 52 is controlled. In accordance with the invention, if flip-flop 54 would tend to change state prior to the time that a 90° pulse is received by way of central output channel 66a, then flip-flop 54 is caused to wait until the time of that 90° pulse before changing state. On the other hand, if the timing of sequence controller 26 is such that flip-flop 54 would change state prior to the time that a 90° pulse appears on output 66a then flip-flop 54 is caused to change state at the time of that 90° pulse. This controlling operation of flip-flop 54 is provided by flip-flop 86 and associated circuitry as later described in detail. With such control, sequence controller 26 produces signals for a sinusoidal waveform which are in time sequence with the 90° pulses stored on the tape channel 66a of tape recorder 66.

It will be understood that as a result of the variation in operation of flip-flop 54, the resultant sine wave will have some minor distortion. However, this minor distortion is substantially less significant than the exceedingly important time coordination of phase and frequency of the sine wave of the function generator 10a and correlator 64 during correlation of the data on the tape.

As previously described, during recording of the tape, the 90° pulse output 54a is recorded on the tape channel corresponding to output channel 66a. Thus, the signal input to that channel is a square wave shown in FIG. 4 in which the state is changed every 90° of the sine wave of FIG. 1 with a positive going signal being considered a 1-state and a negative going signal a 0-state. During playback of the square wave of FIG. 4, the tape produces a positive pulse spike during each rising edge of the recorded square wave, while a negative pulse spike is produced during each falling edge of the recorded square wave. Since the rising edge of the square wave indicates the setting of flip-flop 54 while the falling edge indicates the resetting of flip-flop 54, it will be understood that the positive spike during playback should be effective to set flip-flop 54 while the negative spike should be effective to rest that flip-flop.

More particularly, output 66a is applied by way of an isolating capacitor 80 to an input of a first inverter amplifier 82 and then by way of a second inverter amplifier 84 to the input set side S of a flip-flop 86. In addition, conductor 66a is applied by way of an isolating capacitor 87 to an input of an additional inverter amplifier 90 having its output connected to the input reset side R of flip-flop 86. Flip-flop 86 as well as flip-flop 54 are of the type which only switch their stable state during input positive going pulses. Thus, a 1-state positive pulse applied to the set input is effective to set the flip-flop to produce a 1-state positive going signal from the 1-side output. Similarly, a positive pulse applied to the rest input is effective to reset the flip-flop to produce a 1-state signal from the 0-side output.

When channel 66a produces a positive going pulse, at time $t_1$, FIG. 4, that pulse is inverted twice by amplifiers 82 and 84 and applied as a positive switching pulse to the set side of flip-flop 86. In this manner, flip-flop 86 is switched to its set state. On the other hand, the positive pulse from channel 66a is inverted by amplifier 90 to a negative going pulse which has no effect at the reset terminal of flip-flop 86. Upon application of a negative going spike from channel 66a, at time $t_2$, a positive spike or pulse is produced by inverter amplifier 90 which is effective to reset flip-flop 86. At the next positive going spike or pulse, at time $t_3$, flip-flop 86 is again switched to its set state. In this manner, the flip-flop 86 produces at its 1 and 0-side output terminals a square wave similar to the recorded control signals. The outputs of flip-flop 86 are connected to an input terminal of AND gates 92 and 94 respectively with the remaining input terminals of gates 92 and 94 being connected to a tape playback terminal 95. Terminal 95 is energized during playback to enable both gates 92 and 94 whose outputs are connected by way of respective diodes 96 and 98 to the 1 and 0-side output terminals respectively of flip-flop 54. Thus, if the setting of flip-flop 86 occurs prior to the time that flip-flop 54 is set, then a positive-going signal from the 1-side of flip-flop 86 is applied by way of diode 96 to set flip-flop 54.

On the other hand, if a signal is applied to the set input of flip-flop 54 to attempt to set that flip-flop prior to the time that flip-flop 86 is set, then flip-flop 54 is maintained in its reset state by the clamping action of diode 98 and AND gate 94. Specifically, prior to the time that flip-flop 86 is set, its 0-side is in a 1-state (positive going signal) which is applied by way of gate 94 and diode 98 to the 0-side of flip-flop 54. This 1-state positive going signal is effective to clamp flip-flop 54 in its reset state even though the input signal to that flip-flop would tend to set that flip-flop. Accordingly, an input signal to the set input is only effective to set flip-flop 54 when flip-flop 86 is set. In this manner, the setting of flip-flop 54 is in synchronism with the setting of flip-flop 86.

Similarly, the resetting of flip-flops 54 and 86 are also in synchronism. If flip-flop 86 is reset prior to the time that flip-flop 54 is reset, then its 0-side provides a 1-state positive going signal which is applied to the 0-side of flip-flop 54. That signal is effective to reset flip-flop 54. On the other hand, if the input signal to the reset input of flip-flop 54 tends to reset that flip-flop prior to the time that flip-flop 86 is reset, then the 1-state signal applied by way of the 1-side of set flip-flop 86 is effective to maintain flip-flop 54 in its set state until flip-flop 86 is reset.

In accordance with the invention, flip-flop 54 is in exact time sequence with the 90° pulses (control signals) stored on the tape. Thus, sequence controller 26 produces timing signals in time sequence with the 90° pulses on the tape as well as the test point data on the tape. Since these timing signals control the synchronism of correlator 64, then it will be understood that correlator 64 operates in synchronism with any selected one of the tape channels 67–70. Thus, for example, any variation in tape speed will have no effect on this measurement synchronism.

What is claimed is:

1. A system for time synchronizing a transfer function analyzer with recorded test point signals comprising a function generator for producing an output waveform including means for producing separate signals of (1) substantially rectangular characteristics, (2) upwardly sloping characteristics, and (3) downwardly sloping characteristics, controlling means for superimposing selected ones of said upwardly sloping signals and said downwardly sloping signals on said rectangular signals, first bistable means for applying control signals to and having switching signals applied from said controlling means alternately (1) for superimposing only upwardly sloping signals during a 90° segment of said output waveform and (2) only downwardly sloping signals during the next 90° segment, means for applying said output waveform as a stimulating signal to a system to be tested having a plurality of test points, means for recording simultaneously with time signals at predetermined system test points and said control signals, means for playing back said recording, correlator means connected to said controlling means and said playback means and having applied thereto a selected one of said recorded system test point signals for measuring the transfer function of said selected signals in time synchronism with said function generator, second bistable means connected to said playback means for changing stable state in response to said recorded control signals, and gating means connecting outputs of said first and second bistable means to switch said first bistable means when said second bistable means is first switched by said recorded control signals and to prevent the switching of said first bistable means when said switching signals tend to first switch said first bistable means until said recorded signals switch said second bistable means whereby said correlator means operates in synchronism with said selected recorded test point signals.

2. The system of claim 1 in which said playback means includes a plurality of channels with a differing channel for each of said recorded test point signals and a separate control channel for said control signals, means connected between said control channel and a second input of said first bistable means for applying thereto said recorded control signals and inverting means connected between said control channel and a second input of said second bistable means for applying thereto inverted recorded control signals.

3. The system of claim 1 in which said first and second bistable means are flip-flops and in which said gating means comprises a first gate having an input connected to a first output of said second flip-flop and an output connected to a first output of said first flip-flop and a second gate having an input connected to a second output of said second flip-flop and an output connected to a second output of said first flip-flop.

4. The system of claim 3 in which there is provided signal means connected to an additional input of said first and said second gate for enabling said first and second gates only during playback of said recording.

5. A system for time synchronizing a transfer function analyzer with recorded test point signals comprising, a function generator for producing a substantially sinusoidal output waveform including means for producing separate signals of (1) substantially rectangular characteristics, (2) upwardly sloping triangular characteristics, and (3) downwardly sloping triangular characteristics, controlling means for superimposing selected ones of said upwardly sloping signals and said downwardly sloping signals on said rectangular signals, a first flip-flop for applying control signals to and having switching signals applied from said controlling means alternately (1) for superimposing only upwardly sloping signals during a 90° segment of said output waveform and (2) only downwardly sloping signals during the next 90° segment, means for applying said sinusoidal output waveform as a stimulating signal to a system to be tested having a plurality of test points, means for recording simultaneously with time on different channels (1) data signals from predetermined test points and (2) the control signal output of said first flip-flop, means for playing back said recording (1) of said control signals and (2) of a selected one of said test points, correlator means connected to said bistable means, said controlling means and to said playback means and having applied thereto said selected recorded system test point signal and said control signals for measuring the transfer function of said selected signals in time synchronism with said function generator, a second flip-flop connected to said playback means for changing stable state in response to each of said recorded control signals and gating means connected between the outputs of said first and second flip-flops (1) to switch said first flip-flop to a stable state corresponding to that of said second flip-flop when said second flip-flop is first switched by said recorded control signals and (2) to prevent the switching of said first flip-flop when said switching signals tend to first switch said first flip-flop until said recorded control signals switch said second flip-flop to a corresponding stable state whereby said correlator means operates in synchronism with said selected recorded test point signals.

6. The system of claim 5 in which said playback means includes a plurality of playback tape channels, a differing channel for each of said recorded test point signals and a separate control channel for said control signals, connection means including a first capacitor coupled between said control channel and a second input of said first flip-flop and inverting connection means including a second capacitor coupled between said control channel and a second input of said second flip-flop.

7. The system of claim 6 in which said gating means comprises a first AND gate having an input connected to a first output of said second flip-flop and having an output connected to a first output of said first flip-flop and a second AND gate having an input connected to a second output of said second flip-flop and having an output connected to a second output of said first flip-flop.

8. The system of claim 7 in which there is provided enabling means connected to an additional input of said first and second AND gates for only enabling said gates during playback of said recording.

References Cited
UNITED STATES PATENTS 3,340,469  9/1967  Catherall et al. _____ 324—57

RUDOLPH V. ROLINEC, *Primary Examiner.*

E. E. KUBASIEWICZ, *Assistant Examiner.*

U.S. Cl. X.R.

235—181; 324—77; 340—174.1